Aug. 5, 1924.

W. F. BUTLER 1,503,635

ADJUSTABLE HOLDER FOR GRIPPING THE ENDS OF SHORT RODS

Filed Nov. 15, 1922

INVENTOR:
WILLIAM F. BUTLER by Spear, Middleton, Donaldson & Hall
Attys.

Patented Aug. 5, 1924.

1,503,635

UNITED STATES PATENT OFFICE.

WILLIAM FRANK BUTLER, OF LONDON, ENGLAND.

ADJUSTABLE HOLDER FOR GRIPPING THE ENDS OF SHORT RODS.

Application filed November 15, 1922. Serial No. 601,190.

*To all whom it may concern:*

Be it known that I, WILLIAM FRANK BUTLER, a subject of the King of Great Britain, and residing at 32 Brodrick Road, Wandsworth Common, London, S. W., England, have invented a new and useful Adjustable Holder for Gripping the Ends of Short Rods, of which the following is a specification.

This invention relates to an adjustable holder for gripping and holding one end of a short stick or rod of any material which is gradually used up from its other end. The object of the invention is to provide a holder by which the stick as it gets shortened can be conveniently gripped and held, so that less waste of material is involved in throwing away the residual short piece before beginning to use a new stick. "Shaving sticks" of soap are examples with which the device can be used.

The invention consists in an adjustable holder comprising a disc provided with radial grooves in one face thereof, a plurality of grip members slidably lodged in said grooves, a handle member rotatably mounted coaxial with said disc and provided with spiral grooves on its face adjacent to said disc, studs or pips projecting from said grip members into said spiral grooves, and a central shouldered stud retaining said disc and handle member in relative axial position.

The invention also consists in locking means for preventing relative movement of said disc and grip members, comprising a lock nut screwed on one end of the central stud.

The invention also consists in an adjustable holder as above set forth, in which the handle member, and it may be also the lock nut, is in the form of a cup knurled at the periphery, and the grip members are made of flat bar or sheet metal and are bent at their outer ends.

I append drawings illustrating my invention as carried into effect in one form.

Figure 1:
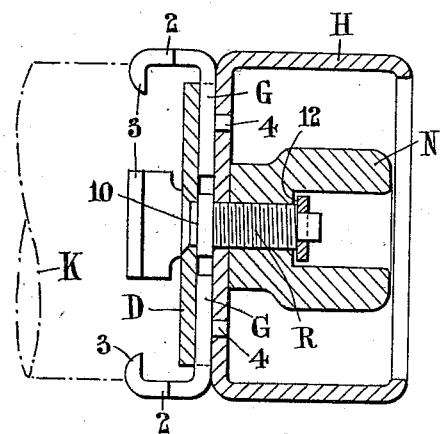
Figure 2:
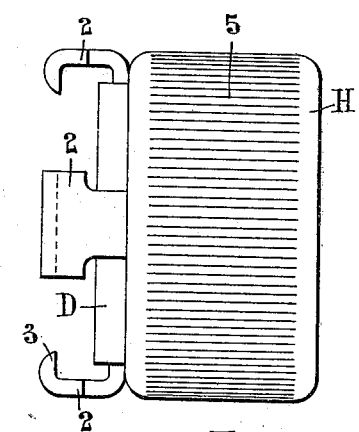
Figure 3:
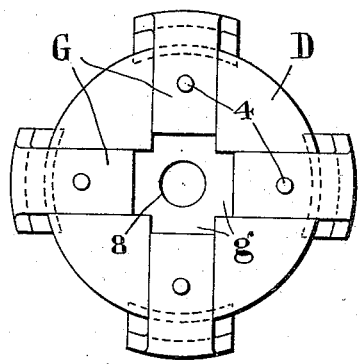
Figure 4:
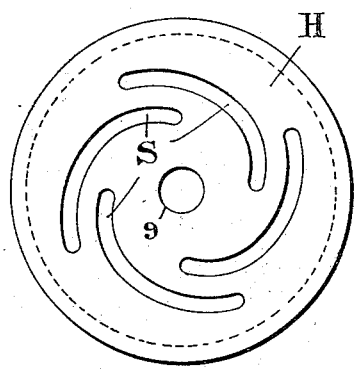
Figure 5:
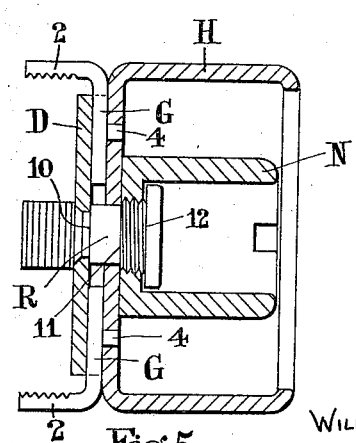

Fig. 1 is a sectional view of the holder.
Fig. 2 is a side elevation.
Fig. 3 is a view of the disc and grip members.
Fig. 4 is a view of the handle member looking at its grooved face.
Fig. 5 is a view showing a modification of the central stud and lock nut.

The disc D has radial grooves $g$ cut on one of its faces, and in these are slidably lodged the grip members G. The latter are bent at their outer ends so that each has a short length 2 parallel to the axis of the disc adapted to serve as jaws to grip the sides of the stick to be held. For use with soft material, a short length may be turned inwards as shown at 3, Fig. 1, forming a hook which bites into the stick K which is to be held. For use with harder materials the hooks 3 are dispensed with, and the jaws 2 may be serrated.

A stud, pip or ridge 4 integral with or fastened to each grip member projects beyond the face of the disc. The handle member may be in the form of a cup H knurled at its periphery 5, and has spiral grooves S cut on one flat face. The said flat face is placed in contact with the grooved face of the disc D, the studs or pips 4 on the grip members projecting into the said spiral grooves. The disc D and cup H are held together by means of the central shouldered stud R passing through the axial holes 8 and 9 in the disc and cup respectively. In Fig. 1, the stud R is shown riveted to, and with its shoulder 10 hard up against, the disc D. A lock nut N is screwed on the other end of the stud R, and is retained from being screwed off by means of the projecting shoulder 12, which may be a washer riveted to the end of the stud. The axial travel of the lock nut is very small, merely sufficient to relieve the pressure between the disc D and cup H, so as to permit the latter being turned on the central stud R.

As shown in Fig. 5, the shoulder 12 may be made integral with the stud R, the screwed part of the stud being of larger diameter than the shank, with a shoulder 11 against which the cup may bear when the lock nut N is run back against the shoulder 12.

In Fig. 1, the spiral grooves S are shown as cut right through the metal of the cup H, but obviously if the handle member is of substantial thickness the spiral grooves need not be cut right through.

The holder is used as follows:—The lock nut N is run back against the shoulder 12, the cup H is turned relative to the disc D forcing the grip members G outwards until the stick to be held can be placed between the jaws 2 against the face of the disc. The cup H is then turned in the reverse direction until the jaws 2 grip the stick firmly.

The lock nut is then screwed hard against the cup, thus locking the parts in the set position.

The combination of a disc member with radial grooves, grip members slidable in said grooves, and a member coaxial with the disc member and provided with spiral grooves in which the grip members engage is well known in lathe chucks; and of course I do not claim such combination per se.

I claim:

A device to grip and hold the ends of a rod, including adjustable arms, means to cause movement of said arms to and from the rod comprising a knurled cup H engaging the arms and forming a handle for the rod, a threaded stud R secured to a plate D and penetrating the cup H thereby clamping said arms between said cup and plate, and means N entirely within the cup member and threaded to the stud R for retaining the arms in the desired position.

In testimony whereof I have signed my name to this specification.

WILLIAM FRANK BUTLER.